Patented July 8, 1941

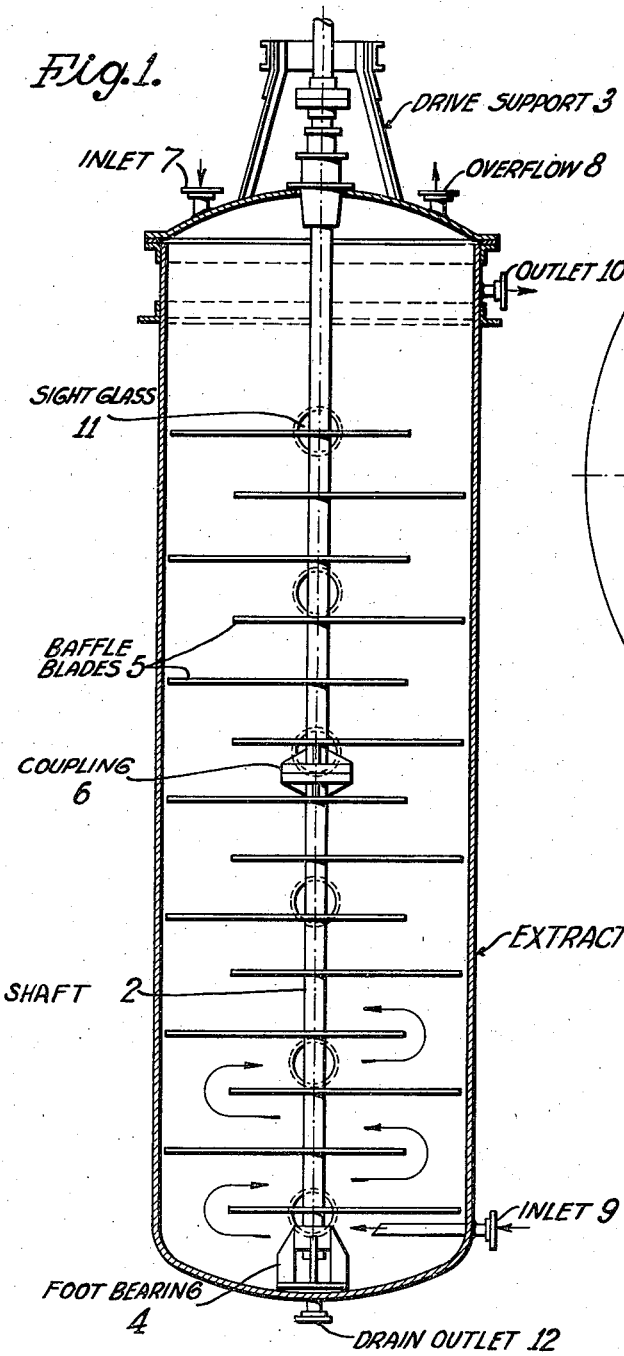
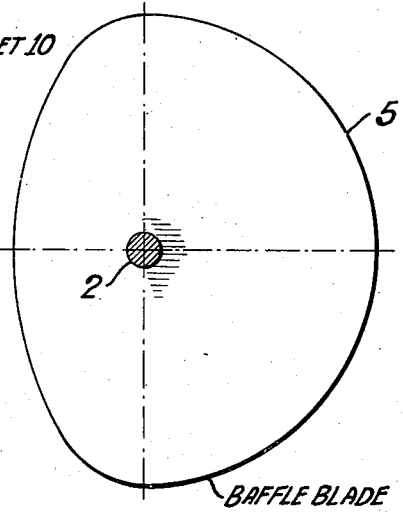

2,248,620

UNITED STATES PATENT OFFICE 2,248,620

EXTRACTION APPARATUS

Louis Freedman, Mount Vernon, and Harry Ennis Dubin, New Rochelle, N. Y., assignors to U. S. Vitamin Corporation, New York, N. Y., a corporation of Delaware Application January 24, 1939, Serial No. 252,518

9 Claims. (Cl. 23—270.5)

This invention relates to an apparatus for the extraction of a substance from a liquid medium by a second liquid medium. More particularly, it is concerned with the extraction of a vitamin from an oleaginous material having a vitamin bearing difficultly saponifiable fraction by contacting with an immiscible solvent of a different specific gravity, and includes correlated improvements and discoveries whereby the extraction of a substance may be enhanced.

Various methods have in the past been described for the extraction of the non-saponifiable fractions from oils, such as fish liver oils, by converting the oils into soaps and extracting the non-saponifiable fraction therefrom by means of various solvents. The methods of extracting the non-saponifiable fraction have been described from the standpoint of the chemistry of the extraction rather than from the mechanics of the extraction.

In these prior processes, the extraction operations on a commercial scale have been beset by various difficulties, chiefly of a mechanical and physical nature. Some of the difficulties from an economical standpoint, are large and costly apparatus, multiplicity of operations requiring excessive labor charges, large volumes of solvents, and mechanical difficulties obvious to those skilled in the art. Physical difficulties involved in the heretofore described processes are absorption or emulsification of the solvent by the soap, resulting in slow or incomplete extraction of the non-saponifiable fraction by the solvent; repeated washings or leachings of the soap with large volumes of solvent resulting in loss of time in the extraction and settling or separation of the soap and solvent layers, and recovery of enormous volumes of solvent with attendant losses thereof.

In a process of continuous extraction, particularly as in the continuous extraction of vitamins in the non-saponifiable or difficultly saponifiable matter from soap solutions prepared from fish liver oils, efficient and economical extraction of the vitamins are difficult because of improper percolation of the solvent through the soap, particularly if the mixture is not agitated. Agitation increases the percolation effect, but results in troublesome emulsions between the soap and solvent, thereby interfering with the extraction effectiveness of the solvent.

Direct extraction of vitamins from soap solutions by percolation of the solvent from below, when using a solvent of lower specific gravity than the soap solution, e. g., ether, or as in the case of a solvent of higher specific gravity than the soap, such as chloroform, ethylene dichloride, and other chlorinated hydrocarbons, where the solvent enters from above, is time consuming, requires several days to extract one batch of commercial size, and enormous volumes of solvent are used. Further, when the solvent containing extracted vitamins is recovered continuously and simultaneously with the extraction, it undergoes protracted heating, and a loss of potency of the vitamins occurs.

It is an object of the invention to provide an apparatus for the extraction of a substance wherein a liquid medium containing the substance is contacted with a second liquid medium which is immiscible with and of different specific gravity than the first medium, but which is a solvent for the extractable substance.

A further object of the invention is an improved apparatus for the extraction from oils, fats, waxes, etc., of animal, vegetable or mineral origin of substances dissolved or otherwise held therein by means of an immiscible solvent of different specific gravity than the medium in which the dissolved substances where originally contained.

Another object of the invention is an improved apparatus for the continuous extraction from oils, fats, waxes and tissues of animal or vegetable origin, of the non-saponifiable or difficultly saponifiable matter contained therein.

A still further object of the invention is the provision of an apparatus for the continuous extraction of vitamins contained in oils, fats and tissues of animal or vegetable origin, by extracting from a soap prepared from such materials, the non-saponifiable fractions containing the desired vitamins, by a solvent of different specific gravity and immiscible with said soap, and more particularly of vitamins contained in fish livers and fish liver oils.

Other objects of the invention will in part be obvious and will in part appear hereinafter.

The invention accordingly comprises the apparatus embodying features of construction, combinations of elements and arrangement of parts, all as exemplified in the following detailed disclosure, and the scope of the invention will be indicated in the claims.

For a fuller understanding of the nature and objects of the invention reference should be had to the following detailed description taken in connection with the accompanying drawing, in which there is shown the apparatus in which the extraction process may be effected.

The apparatus comprises in combination, Fig. 1, an enclosed cylindrical tank 1 constructed of wood, stoneware, steel, or any other metal or material suitable for the type of extraction involved, and having a height to diameter ratio of approximately 3.4 to 1; a revolvable shaft 2 extending from a drive support 3 to foot bearing 4; and fastened to said shaft by welding or otherwise, a series of novelly constructed baffle blades 5 spaced apart at specified distances.

The baffle blades, illustrated in detail in Fig. 2, are, preferably, in the shape of discs of which one-half of the circumference is circular and the other half elliptical, the shortest radius of the ellipse being upwards to one-half the radius of the circular part of the disc and desirably in the ratio of about 1 to 1.4 to 1.8. The baffle blades of semi-circular, semi-elliptical form may, desirably, be placed on the shaft in staggered positions, with the long radius and the short radius in alternation. The longest radius of the baffles is only slightly less than the radius of the extractor tank, and the difference suitably is only the space necessary to allow for clearance between the walls of the tank, and the perimeter of the baffle. Spacing of the blades on the shaft is, preferably, at a distance approximately equal to the shortest radius of the elliptical part of the blade. Such spacing may, however, be varied up or down, and the number of blades may be varied, depending on the type of extraction to be made and also on the size of the extractor.

As an illustrative embodiment of a manner in which vitamins cointained in a non-saponifiable fraction of a water soluble soap solution prepared from a cod liver oil may be extracted, the following description is presented.

A soap solution may be prepared by treating an oil or oil-bearing material with a caustic alkali. A potassium or sodium soap is preferred due to easier solubility in water, and in water-alcohol mixtures. The soap solution may be an all aqueous solution, or it may be a mixture of water and ethyl alcohol, or other alcohol readily miscible with water. Other substances or solvents may be added to the soap prior to extraction, either to reduce the emulsifying effect of the soap, or to increase the extraction effect of the solvent on the unsaponifiable matter. In general, the soap solution contains a sufficiently high percentage of water so as to be substantially immiscible with the solvent to be used for extraction.

The solvent used may be ethylene dichloride, which has a specific gravity of approximately 1.255, chloroform, carbon tetrachloride, or other chlorinated hydrocarbon which is a good lipoid solvent. Other solvents that may be utilized are ethers, as ethyl ether, ligroin and other petroleum ethers.

2500 grams of cod liver oil are mixed in a suitable vessel with 2000 cc. 95% ethyl alcohol. A solution of 675 grams of 85% potassium hydroxide dissolved in 450 cc. of water are added carefully with agitation. The mixture is heated at reflux temperature for 1 to 1½ hours, or until saponification is completed. Displacement of the air in the saponification vessel by nitrogen or other inert non-oxidizing gas helps to protect the vitamins from oxidation. The saponification mixture is cooled and a mixture of 7500 cc. water and 1750 cc. of 95% ethyl alcohol added. The resulting soap solution contains approximately 25% alcohol by volume.

During the extraction, using as solvent ethylene dichloride for example, a certain amount of the ethylene dichloride will be absorbed by the soap solution and a certain amount of the alcohol present in the soap will go into the solvent, so that at the end of the extraction, as we have found by analysis, the soap solution will contain approximately 18% by volume of ethylene dichloride and the ethylene dichloride will contain approximately 3% by volume of ethyl alcohol. Consequently, by virtue of the mutual solubilities of ethyl alcohol and ethylene dichloride, an equilibrium is reached, and this equilibrium is maintained throughout the extraction. It is apparent, therefore, that under the conditions of this equilibrium, the most advantageous conditions for extraction are maintained. Therefore, if the solvent and soap solutions are adjusted to this equilibrium before the start of the extraction, optimum conditions for extraction will prevail from the start.

To the soap solution are now added 3250 cc. of ethylene dichloride to give a mixture containing approximately 18% ethylene dichloride by volume.

The extractor, shown in Fig. 1, is charged through nozzle 7 with ethylene dichloride to which has been added 95% ethyl alcohol to give a mixture containing approximately 3% alcohol by volume.

The amount of solvent may be varied depending on the quantity of soap, but in general, if the extractor is used to capacity, the height of the solvent in the extractor should be up to nozzle 10, or a distance below the overflow nozzle 8 sufficient to allow a head of soap to accumulate before overflowing.

The soap solution contained in a soap reservoir (not shown) flows by gravity by means of a conduit through nozzle 9, situated on the side near the bottom, into the extractor. Rate of flow of the soap, regulated by a valve, is such that the soap being lighter than the solvent, rises at a definite and predetermined rate through the solvent in the general direction indicated by the arrows until it overflows through nozzle 8, and runs by way of a conduit into a spent soap receiver.

The stream of soap solution enters the tank via nozzle 9 strikes the non-miscible solvent, and as it rises through the heavier solvent, is broken up into globules or bubbles by the revolving blades or discs. The passage of the soap globules through the solvent is so delayed by the baffling effect of the staggered revolving discs, that they contact a large surface of the solvent giving up to the solvent the non-saponifiable fraction which contains the desired vitamins, and was dispersed in or held by the soap solution. As the globules of soap continue to rise, they successively strike the revolving baffling discs, are retarded in their rate of rising and broken up into smaller globules, so that the globules of soap near the top of the extractor are only a fraction of the size of the globules of soap at the bottom of the extractor. The shaft to which the discs are fastened is connected to a variable speed drive by means of a coupling arrangement, and is revolved at a moderate speed sufficient to act as moving baffles but still not fast enough to cause emulsification of the soap with the solvent. In this process, only one liquid, i. e., the soap solution, is actually flowing in a vertical direction whereas the solvent is from the standpoint of a vertical flow, practically stationary. The baffling and retarding action on the soap globules has an effect which is that of a column many times its height.

Observation glasses 11 are located in both sides of the extractor diametrically opposite to each other, and provide for visual observation of the extraction process.

Extraction of vitamins can be accomplished in from three to six hours depending on the size of the batch, and from 90 to 95% of the vitamins present in the original material can be removed in one extraction. If desired, a second extraction of the soap can be made by simply running the soap again through the same or a fresh lot of solvent. Thus, two extractions of each lot or soap may be made with one lot of solvent yielding from 95 to 100% of the original vitamin content.

The foregoing procedure provides a process for the continuous extraction of vitamins from fish livers, fish liver oils and other animal or vegetable material, which materially avoids many of the difficulties previously encountered; which is economical to operate commercially from the standpoint of mechanical equipment, cost of labor, and utilization of time; and, which results in the recovery of high yields of a vitamin-containing fraction without material loss of potency.

The process and apparatus accordingly effect an extraction by a combination of procedural steps, which comprises contacting a liquid medium containing a substance to be extracted, especially a vitamin from a soap solution, with a second liquid medium which is substantially immiscible with and of different specific gravity than the first medium, but which is a solvent for said substance, by passing one of these mediums through the other in a retarded tortuous, preferably continuous, flow, along predetermined or determinate paths or channels and with increasing surface contact. It is advantageous in order to insure a high yield and under certain conditions it will be preferable, that the extraction be carried out in an inert atmosphere such as nitrogen or other non-oxidizing gas.

In the above description the soap solution enters at the bottom and rises to the top through the solvent of higher specific gravity. This procedure may be reversed. Thus, the soap solution may be charged into the extractor and the solvent of higher specific gravity allowed to enter at the top and percolate through the soap being broken up into globules and the globules retarded in their downward course by the revolving baffle discs.

If a solvent of lower specific gravity than the soap, as for example, ethyl ether, ligroin, or other petroleum ether, is used, then it is advantageous to charge the soap into the extractor and percolate the solvent through the soap solution from the bottom to the top, thus allowing the force of gravity to assist in the retarding and baffling effect. The operation is carried out as hereinbefore described, with the exception that the procedure of adding soap and solvent are reversed.

While we have above described the construction of the apparatus according to shape, size and dimensions, particularly the revolving baffling discs, it will be understood that we do not limit ourselves to the described shape or dimensions. The size, number and shape of the baffling discs may be varied. Also, the ratio of height to diameter of the extractor may vary from the given ratio of 3.4 to 1. It may be 2.0 to 1; or 4 or 5 to 1, respectively. In general, the higher the ratio, the more efficient the extraction, and for commercial purposes, the diameter should be large enough to give desired volume without departing too much from convenience of height.

The process utilizes the baffling and retarding effect of the revolving discs on the passage of the soap solution through the solvent in such a manner as to cause the breaking up of the soap into small globules which results in maximum extraction in a short time without causing emulsification of the soap solution and solvent.

Moreover, the apparatus is not limited to the extraction of vitamins from soap solutions prepared from the original oils containing the vitamins, nor to the extraction from soap solution of the non-saponifiable matter originally contained in fish livers, fish liver oils, or other animal or vegetable material. It may be used for the extraction of substances dissolved or otherwise held in one medium by a second medium of different specific gravity and immiscible with the first medium.

Thus, it may be used for direct extraction from fish oils, fish liver oils, and the like, without saponification of the oils, of vitamins contained therein, by means of a solvent of appreciably different specific gravity and immiscible with the oil, as for instance, methyl, ethyl, propyl, and isopropyl alcohols. In general, the aliphatic alcohols of lower molecular weight, and which are miscible with water, are well adapted for this purpose.

Furthermore, other oils, such as lubricating oils, mineral oils, and the like, may have impurities, contained therein naturally or added for purposes of refining, extracted by means of an immiscible solvent having different specific gravity.

This application is a continuation-in-part of our copending application Serial No. 146,776, filed June 7, 1937.

Since certain changes in the constructions set forth, which embody the invention may be made without departing from its scope, it is intended that all matter contained in the above description, or shown in the accompanying drawing, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. An extraction apparatus which comprises in combination an extraction vessel, a revolvable shaft extending into said extraction vessel, a plurality of baffle discs secured to said shaft, said baffle discs being so constructed as to provide relatively slight clearance with the vessel walls at one edge and a relatively greater clearance at another edge and so arranged as to cause a medium passing through the extraction vessel to travel through determinate paths and in a retarded and tortuous manner.

2. An extraction apparatus, which comprises in combination an extraction vessel having a height at least double its diameter, a revolvable shaft extending into said extraction vessel, a plurality of baffle discs secured to said shaft, each of said baffle discs having a part which is semi-circular and another part which is semi-elliptical in outline and said discs being adapted to pass a medium through the extraction vessel with travel through determinate paths and in a retarded and tortuous manner.

3. An extraction apparatus, which comprises in combination an extraction vessel having a height at least double its diameter, a revolvable shaft extending into said extraction vessel, a plurality of baffle discs secured to said shaft, each of said baffle discs having a part which is semi-circular and another part which is semi-elliptical, the shortest radius of the elliptical portion being not more than one-half the radius of the circular portion.

4. An extraction apparatus, which comprises in combination an extraction vessel having a height at least double its diameter, a revolvable shaft extending into said extraction vessel, a plurality of baffle discs secured to said shaft, each of said baffle discs having a part which is semi-circular and another part which is semi-elliptical and positioned upon the shaft in staggered relation so that the semi-circular portion of one disc is in opposition to the semi-elliptical portion of the adjoining disc, and adapted to effect an extraction of a substance from a liquid medium by means of a second liquid medium which is substantially immiscible with said first medium by contacting these media in a retarded tortuous flow, through determinate paths, with increasing surface contact, and without emulsification of the media.

5. An extraction apparatus, which comprises in combination an extraction vessel having a height at least double its diameter, a revolvable shaft extending into said extraction vessel, a plurality of baffle discs secured to said shaft, each of said baffle discs having a part which is semi-circular and another part which is semi-elliptical and positioned upon the shaft in staggered relation so that the semi-circular portion of one disc is in opposition to the semi-elliptical portion of the adjoining disc, and the distance between said discs being substantially that of the shortest radius of the elliptical section.

6. In an extraction apparatus, the improvement which comprises in combination a revolvable shaft provided with a plurality of baffle discs, each of said baffle discs having a part which is semi-circular and another part which is semi-elliptical in outline, and said discs being adapted to effect extraction of a substance from a liquid medium by means of a second liquid medium which is substantially immiscible with said first medium by contacting these media in a retarded tortuous flow, through determinate paths, with increasing surface contact, and without emulsification of the media.

7. In an extraction apparatus, the improvement which comprises in combination a revolvable shaft provided with a plurality of baffle discs, each of said baffle discs having a part which is semi-circular and another part which is semi-elliptical in outline, the short radius of the elliptical portion being substantially not more than one-half the radius of the circular portion.

8. In an extraction apparatus, the improvement which comprises in combination a revolvable shaft provided with a plurality of baffle discs, each of said baffle discs having a part which is semi-circular and another part which is semi-elliptical in outline, said discs being placed upon said shaft in staggered relation one to another with the semi-circular portion of one disc being in opposition to the elliptical portion of the adjoining disc.

9. In an extraction apparatus, the improvement which comprises in combination a revolvable shaft provided with a plurality of baffle discs which are so constructed as to provide relatively slight clearance with the vessel walls at one edge and relatively greater clearance at another edge and so arranged that when said discs are in motion at a predetermined rate of speed they break a liquid medium into bubbles and cause a retarded and tortuous flow thereof through a second liquid medium immiscible with and of different specific gravity than said first medium and thereby said second medium extracts from said first medium substances which are contained therein.

LOUIS FREEDMAN.
HARRY ENNIS DUBIN.